Nov. 28, 1950     T. G. SCHMEISER     2,531,704
BEARING ASSEMBLY
Filed Nov. 9, 1948
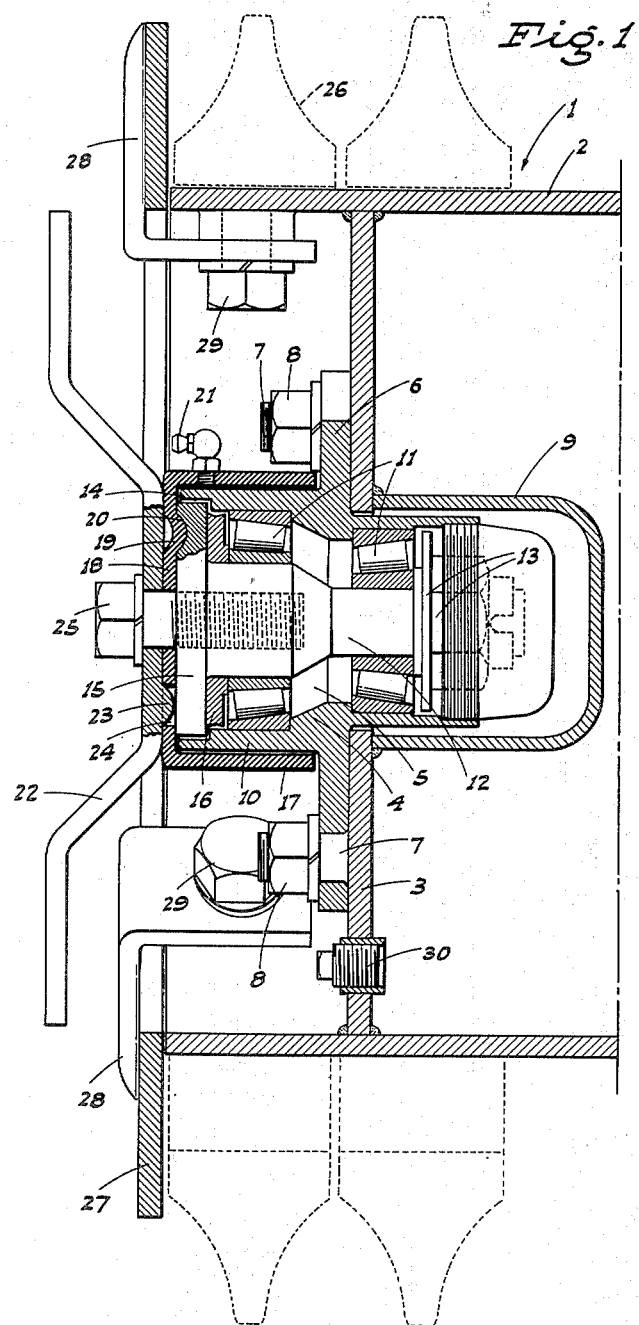
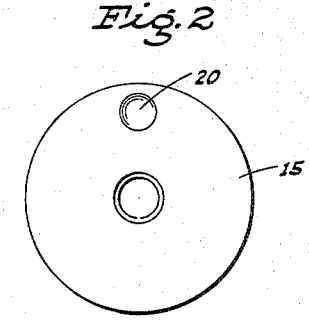
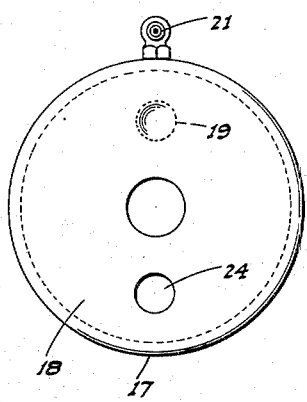
INVENTOR.
*T. G. Schmeiser*
BY
*Webster & Webster*
ATTYS Patented Nov. 28, 1950

2,531,704

UNITED STATES PATENT OFFICE 2,531,704

BEARING ASSEMBLY

Theodore G. Schmeiser, Fresno, Calif.

Application November 9, 1948, Serial No. 59,132

2 Claims. (Cl. 308—22)

This invention relates generally to improvements in earth working roller units of the type which includes a transverse cylindrical roller fitted exteriorly with a row of toothed soil working and compacting rings; the roller including end bearing assemblies which connect to adjacent attachment brackets on a draft frame.

The present invention is directed to improvements in said end bearing assemblies, and in particular it is an object to provide a novel mount between each attachment bracket and the spindle of the corresponding end bearing assembly; such mount including means for the prevention of access of dirt and sand to the corresponding bearing assembly, and also preventing loose wire—as frequently encountered in a field—from wrapping about any moving part of said assembly.

Another object of the invention is to provide a mount, as in the preceding paragraph, which includes a protective cup, fixed relative to the attachment bracket, which encloses a projecting portion of the cage of the corresponding bearing assembly. As the cage rotates with the roller, lack of such protection as said cup affords would allow loose wire to wrap about such projecting portion of the cage, and to jam between the outer end of the latter and the attachment bracket.

A further object of the invention is to provide an attachment bracket mount and protector, as above, which assures of long bearing life with a minimum of service or repair required.

A further object of the invention is to provide a practical and reliable attachment bracket mount and protector for the bearing assemblies of earth working roller units, and yet a structure which will be exceedingly effective for the purpose for which it is designed.

These objects are accomplished by means of such structure and relative arrangement of parts as will fully appear by a perusal of the following specification and claims.

In the drawings:

Fig. 1 is a sectional elevation of one end of an earth working roller unit including a bearing assembly which embodies the present invention.

Fig. 2 is an outer end view of the circular attachment head, detached.

Fig. 3 is an outer end view of the cylinder protector cup, detached.

Referring now more particularly to the characters of reference on the drawings, the invention is here shown as embodied in connection with an earth working roller unit, indicated generally at 1, which roller unit includes a tubular draft cylinder 2 of heavy-duty construction; such draft cylinder 2 including a fixed head 3 adjacent but short of each end.

As the bearing assembly is identical at each end of the roller unit 1, only one of such bearing assemblies is here shown and described.

Each bearing assembly includes a rigid cage 4 which has a bore 5 therethrough from end to end, such cage including, intermediate its ends, an integral radiating flange 6 which lies in face to face abutment against the outside of the fixed head 3, being secured to the latter by studs 7 and nuts 8.

The inner end portion of the rigid cage 4 projects through an opening in the fixed head 3 into an enclosure cap 9 secured to the rear side of said head.

The forward end portion or neck of the cage 4 projects axially outwardly beyond the flange 6, and is indicated at 10.

From the foregoing it will be evident that the cage 4, including its forwardly projecting neck 10, turns or rotates with the cylinder 2 of the roller unit 1 as the latter traverses the ground.

An axially spaced pair of combination annular and thrust bearings 11 are disposed in the cage 4, and support a spindle 12; said spindle being locked up with respect to the aforesaid bearings, and from the rear end, by means of a locked nut and retention washer unit 13.

The outer end of the spindle 12 terminates short of the outer end of the neck 10 of cage 4; said neck 10 being enlarged in diameter at its immediate outer end portion, as at 14, and a circular attachment head 15 is disposed with a relatively close running fit in said enlarged diameter portion of the neck; such circular attachment head 15 abutting flush against the outer end of the spindle.

An annular resilient seal 16 surrounds the spindle 12 between the circular attachment head 15 and the adjacent bearing 11.

A cylindrical protector cup 17 encompasses the entire projecting neck 10 of the cage 4 from the outer end of said neck, and the outer end plate 18 of such cup bears flush against the outer face of the circular attachment head 15.

An inwardly deformed detent 19 on the outer end plate 18 of cup 17, in offset relation to the axis of the latter, seats in a matching socket or recess 20 in the outer face of the circular attachment head 15. This arrangement prevents any relative rotation between said circular attachment head 15 and the cylindrical protector cup 17; the latter having a relatively close running fit with respect to the neck 10. On one side the protector cup 17 carries a grease fitting 21 for the purpose of injecting grease into the cup 17.

A drop center attachment bracket 22 abuts, intermediate its ends, against the outer face of the protector cup 17 diametrally thereof, and relative rotation between the protector cup and said attachment bracket 22 is prevented by a detent 23 on the latter, projecting into a matching socket or hole 24 in the outer end plate 18 of the protector cup 17.

A cap screw 25, threaded axially into the spindle 12, extends through the drop center attachment bracket 22, protector cup 17, and circular attachment head 15, securing the same together in unitary relation, and preventing axial separation thereof.

The attachment brackets 22, at the ends of the roller unit 1, are non-rotatably fixed in connection with a suitable draft frame (not shown).

With advance of the roller unit 1, and turning of the draft cylinder 2, the spindle 12, circular attachment head 15, and protector cup 17, remain stationary or non-rotatable with the drop center attachment bracket 22. As a result, the forwardly projecting neck 10 of cage 4 turns within the cylindrical protector cup 17, but by reason of the embodiment of such cup is not exposed to, nor cannot entangle with or wrap, loose pieces of wire which may be picked up by the roller unit in the field and drawn between an attachment bracket 22 and the corresponding fixed head 3. In short, the protector cup 17 does not permit the neck 10 to pick up or wrap loose pieces of wire, and which would otherwise tend to jam between the attachment bracket 22 and the adjacent rotary parts of each bearing assembly. Additionally, each protector cup 17 does not allow of the entry of dirt or sand into the cage 4. This means that each bearing assembly can be used under extreme working conditions, such as sandy soil, without damage, and said assemblies remain long lived, requiring very little service or maintenance. Additionally, the invention provides an attachment bracket mount and protector, for bearing assemblies, which can be manufactured with economy, and assembled and dissembled readily and with ease.

In the present embodiment the roller unit 1 is of a type which includes a row of toothed, earth working rings 26 disposed on the draft cylinder 2, preferably in radially loose-play relation.

In order to prevent the escape of the rings 26 off the ends of the draft cylinder 2, each end of the latter is fitted with an annular flange 27 which is of substantially greater diameter than said cylinder 2. These annular flanges 27 are rigidly secured to the draft cylinder 2, and at least one of such flanges must be removable so that the rings 26 can be removed for repair or replacement. The removable annular flange 27 is shown in Fig. 1, and it is mounted in place by means of a plurality of right angle lugs 28 which extend into the adjacent end of the cylinder 2, and are there connected to the same by bolts 29.

A plug 30 in one or both of the fixed heads 3 is provided for the purpose of filling the draft cylinder 2 with water, whereby to increase its effective weight.

While the present invention is designed primarily for earth working roller units, it may of course be adapted to other implements which include end bearing assemblies.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A bearing assembly for a roller which includes a fixed end head provided with a central opening; such assembly comprising a rigid cage, an annular flange about the cage intermediate its ends, one end of the cage projecting through the opening in the head and the flange being fixed to the end head of the roller with the other end of the cage projecting outwardly relative to the end head as an annular neck, a spindle projecting axially through the cage, bearings supporting the cage on the spindle, an annular attachment head on the outer end of the spindle, the outer face of such head normally projecting just beyond the outer edge of the neck, an annular cup disposed around the outer surface of the neck, the latter having a close running fit in the cup, the closed end of the cup disposed in face to face contact with the outer face of the attachment head of the spindle and the inner edge of the cup being disposed closely adjacent the outer face of said flange, an attachment bracket, and means securing the bracket, cup and spindle together against relative rotation.

2. A bearing assembly as in claim 1 in which said last named means comprises a recess formed in the outer face of the attachment head, a detent on the inner face of the end of the cup engaged in said recess, a recess formed in the outer face of the cup, a detent on the inner face of the attachment bracket engaged in the last named recess, and a cap screw projecting axially through the attachment bracket, cup, and spindle and being threaded into the latter.

THEODORE G. SCHMEISER.

REFERENCES CITED

The following references are of record in the file of this patent:

UNITED STATES PATENTS

| Number | Name | Date |
|---|---|---|
| 1,793,190 | Philips | Feb. 17, 1931 |
| 2,308,110 | Schmeiser | Jan. 12, 1943 |
| 2,404,535 | Schmeiser | July 23, 1946 |